July 4, 1961 — M. A. HERMAN — 2,990,662
DRIVEN ATTACHMENT FOR A MACHINE TOOL
Filed June 10, 1957 — 6 Sheets-Sheet 1

FIG. I

INVENTOR.
MARTIN A. HERMAN
BY Oldham & Oldham
ATTYS.

July 4, 1961  M. A. HERMAN  2,990,662
DRIVEN ATTACHMENT FOR A MACHINE TOOL
Filed June 10, 1957  6 Sheets-Sheet 4

INVENTOR.
MARTIN A. HERMAN
BY Oldham & Oldham
ATTYS.

July 4, 1961 M. A. HERMAN 2,990,662
DRIVEN ATTACHMENT FOR A MACHINE TOOL
Filed June 10, 1957 6 Sheets-Sheet 5

INVENTOR.
MARTIN A. HERMAN
BY Oldham & Oldham
ATTYS.

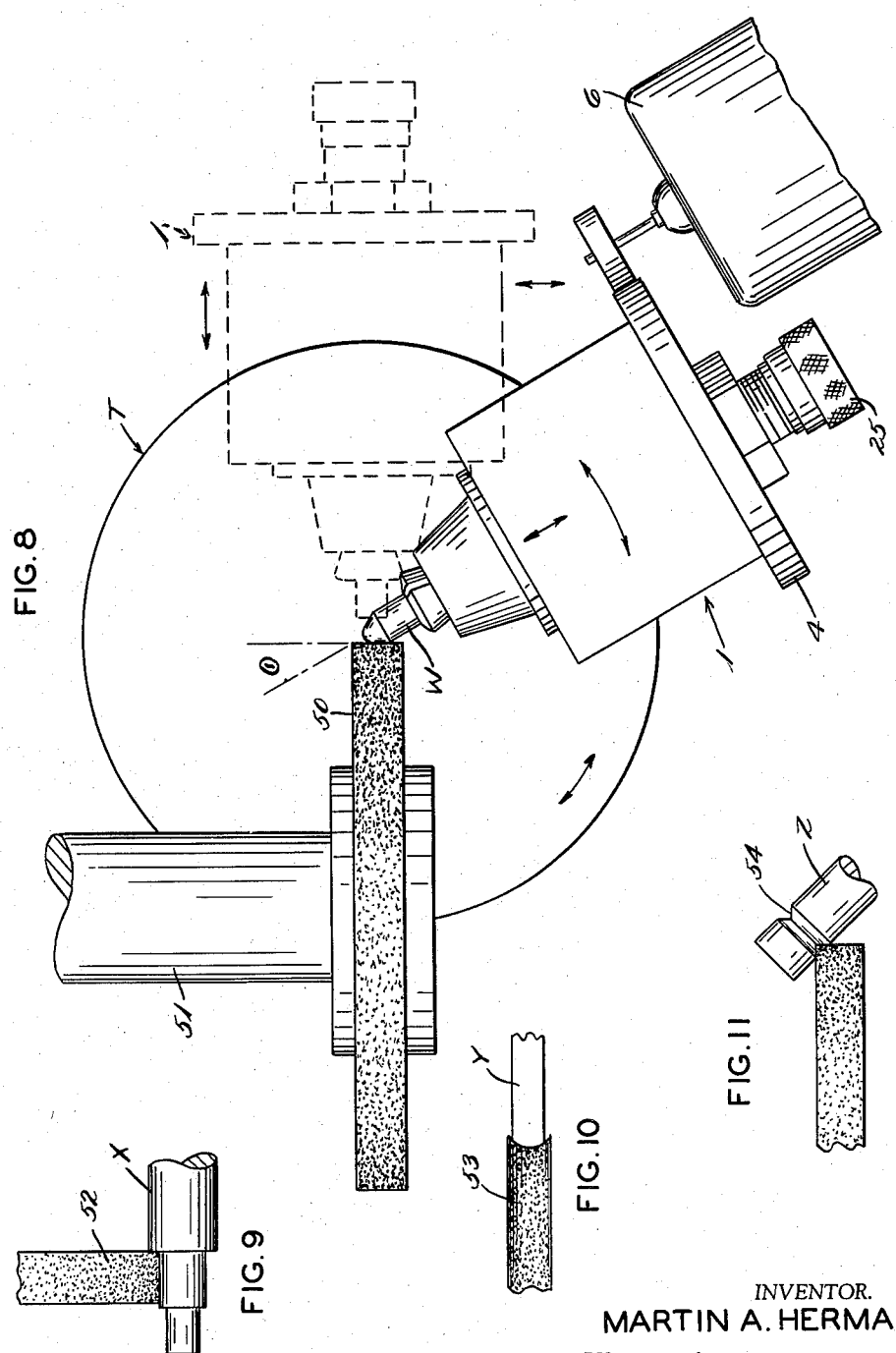

United States Patent Office 2,990,662
Patented July 4, 1961

2,990,662
DRIVEN ATTACHMENT FOR A MACHINE TOOL
Martin A. Herman, 7316 Dudley Ave., Cleveland, Ohio
Filed June 10, 1957, Ser. No. 664,632
3 Claims. (Cl. 51—237)

This invention relates to a driven attachment for a machine tool, such as is used on a grinder, and especially is concerned with means for rotatably positioning a small tool in a fixed, accurate, adjustable position for effecting desired cutting, or grinding action on a member carried by the grinder attachment.

Frequently tool makers and others must provide special shapes or contours upon the ends or other parts of small cutting, grinding or shaping tools or other articles. Even when taking extreme care and working slowly, skilled workmen still find it very difficult to provide exactly the proper shapes upon cutting tools or other articles where great accuracy is required. Hence, it is very desirable to provide some type of a mechanical attachment or control device by which tools or other small members can be positioned and have desired, accurately contoured shapes provided thereon.

The present invention particularly relates to an attachment for use with grinding machines, and wherein the present attachment will position a tool or other small member in an accurate manner with relation to a base plate or other support means, and where the tool will be driven and can be moved into and out of engagement with a grinding wheel provided on a separate machine.

The general object of the present invention is to provide a new and improved attachment for a machine tool wherein the attachment is characterized by the provision of a driven spindle or shaft which spindle or shaft is movable in a plurality of directions with relation to a fixedly positioned grinding wheel for accurately moving a member into and from engagement with such wheel.

Another object of the invention is to provide a frame means or member for a machine tool attachment wherein the frame means carries a drive unit movable therewith and wherein the entire frame means, tool positioning means and drive means can be moved as a unit into a desired accurate position or relationship with another object, such as a grinding wheel.

Still another object of the invention is to provide a relatively small, inexpensive, movable unit for effecting accurately positioned cuts upon a pin or similar member positioned in such attachment means.

Another object of the invention is to provide apparatus for indexing a chuck member or the like so that a pin or other article secured in the chuck member can have accurate grinding operations performed thereon.

Another object is to use a low horse power electric motor to drive a relatively large diameter disc secured to a shaft that carries the work piece for cutting action thereon.

The foregoing and other objects and advantages of the invention will be made more apparent as the specification proceeds.

In the accompanying drawings, there are shown currently preferred embodiments of the principles of the invention, and wherein:

FIG. 8 is a plan of the apparatus of FIG. 7, shown in combination with a grinder and with alternate positions of the unit being indicated; and FIGS. 9, 10 and 11 are fragmentary views showing how the apparatus of the invention can be used to grind shoulders or diameters, special end contours, or grooves, respectively, in a work piece.

When referring to corresponding parts shown in the accompanying drawings and referred to in the specification, corresponding numerals are used to facilitate comparison between the drawings and specification.

It should be noted that the present invention particularly relates to an attachment member such as is adapted to be used in conjunction with another machine tool and wherein the attachment means can be suitably secured to a work plate or table on such other machine tool by either mechanical means, such as clamps; or wherein it can be electro-magnetically secured, as by magnetic means, to the work table of the machine tool. One common use of the attachment of the invention is in combination with a grinder so that pins or other articles such as high speed steel or carboloy bodies can be ground accurately to a desired shape without a special form in the grinding wheel.

The present invention generally relates to an attachment for a machine tool wherein the attachment comprises a frame, a shaft journalled in the frame, a drive disc carried by the shaft, a drive motor positioned on or otherwise supported by the frame, a driven member extending from the motor and engaging the periphery of the drive disc for driving it and the shaft to which it is secured, means carried by such shaft for carrying a member therein for rotary support action thereby, a support plate having a diametrically extending guide, means securing the frame to the support plate for movment along the guide, a base plate, means journalling the support plate on the base plate for rotary movement thereon and other lock means for securing the support plate in a given position on the base plate whereby the carrier means and a member therein can be rotated on its own axis and be brought into desired relationship with means on a machine tool for grinding action on said member while effecting accurate movement therebetween.

Figure 1:
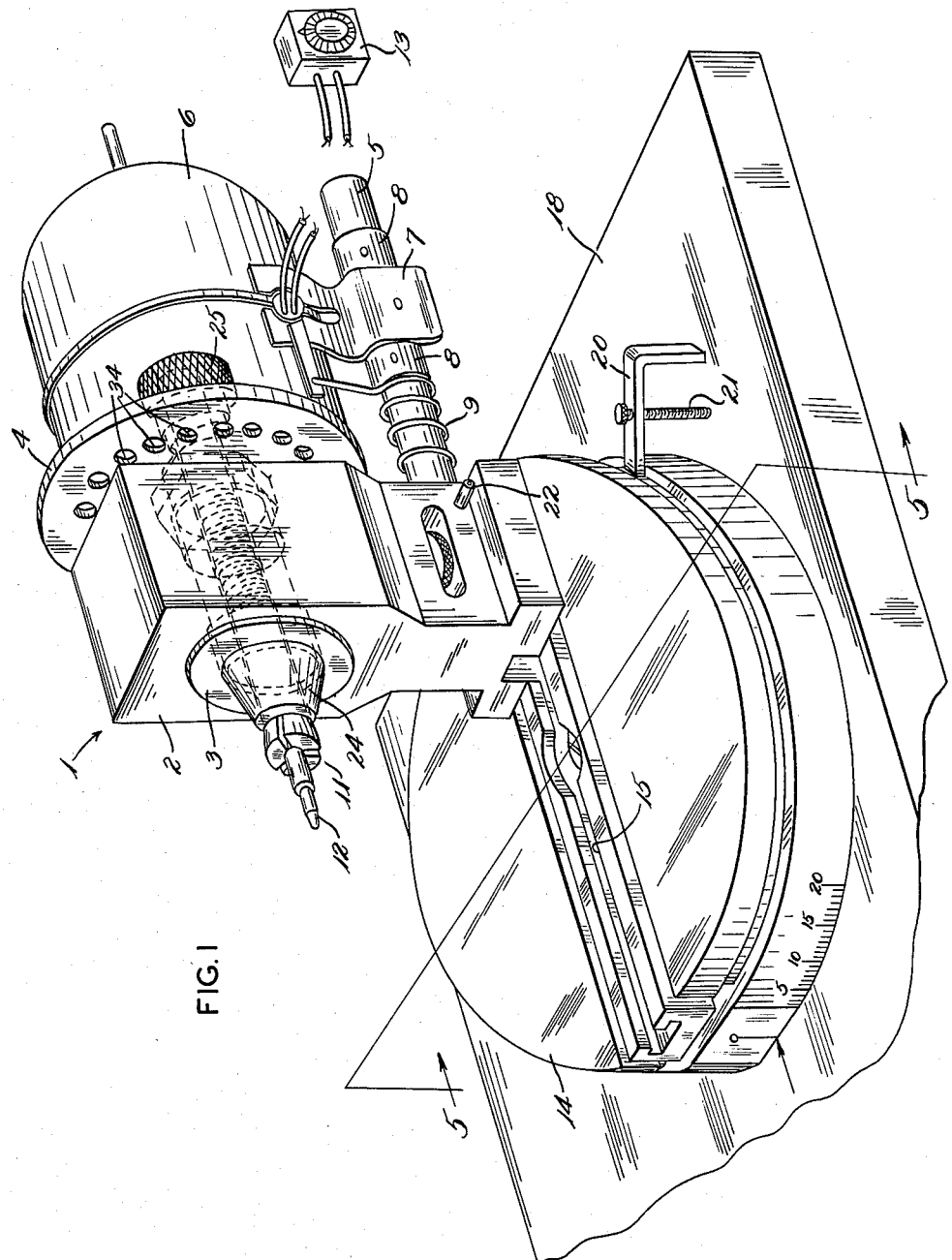
FIG. 1 is a perspective view of an attachment of the invention showing it adapted to be positioned upon the work table of a machine tool.
Figure 3:
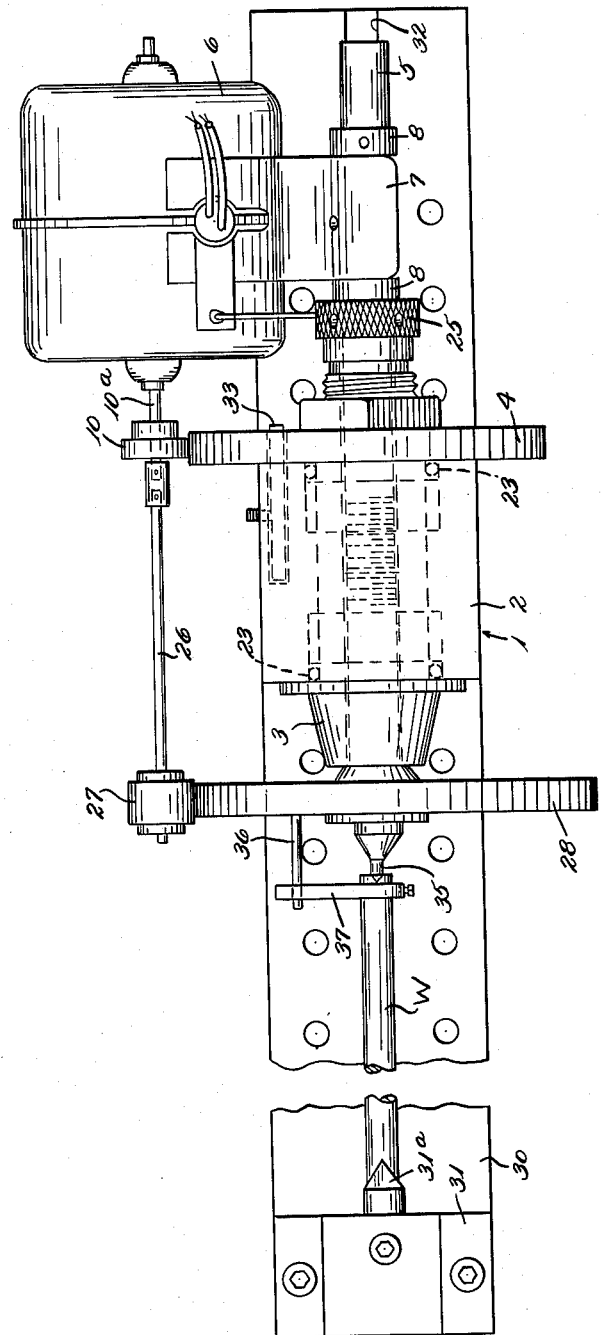
FIG. 3 is a plan of the apparatus shown in FIG. 2.

Reference now should be had to the details of the structure shown in the accompanying drawings, and the attachment of the invention is indicated as a whole in FIG. 1. Such attachment 1 includes a frame 2 which has a drive shaft means, such as a tubular spindle 3 suitably journalled therein and extending therefrom. A primary drive disc 4 is secured to such spindle 3 at one protruding end thereof. A support bar 5, or similar member, extends from and suitably is secured to the frame 2 and it pivotally supports a small electric drive motor 6 affixed thereon. The drive motor 6 preferably is supported on the bar 5 by means of a support bracket 7 secured to and extending between a pair of sleeves 8 on the bar 5 and secured to a portion of the frame of the motor 6. A coil spring 9 also is in telescopic engagement with the support bar 5 and has an end portion engaging the frame or other part of the drive motor 6 to urge the drive motor 6 in a given arcuate direction so that the output shaft 10a of the drive motor 6, which has a primary driving roller 10 provided thereon, as shown in FIG. 3, is brought into rolling frictional engagement with a portion of the periphery of the drive disc 4 for driving such disc and the spindle 3. This provides relatively high torque in the unit 1 even though a relatively small horse power electric drive motor is provided because of the mechanical advantage provided by the apparatus described. A conventional collet, chuck or similar member 11 is operatively associated with the opposite end of the spindle 3 and it is adapted to position a work piece, such as a pin 12 therein for work thereon, as hereinafter described.

Hence, it will be seen that the attachment 1 of the invention primarily comprises an independent frame and drive unit, which is compact and which is adapted to be positioned on other support means for desired movement for the attachment unit 1 as a whole, and specifically for the pin 12 positioned thereby which normally will be rotated with the spindle 3 whenever the motor 6 is energized. Any desired control switch 13 or other suitable member is provided in association with the motor 6. This unit 1 can be mounted on a variety of bases to position the unit 1 and a work piece thereon accurately, and to move it, with relation to a grinding wheel.

Figure 4:
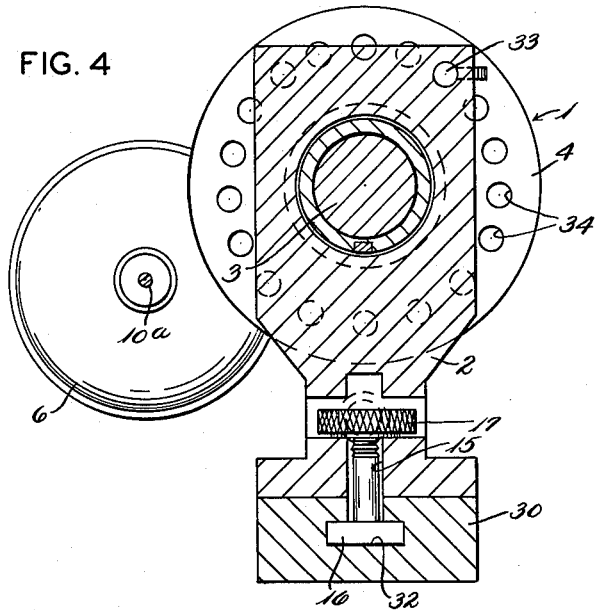
FIG. 4 is a vertical section taken on line 4—4 of FIG. 2.
Figure 5:
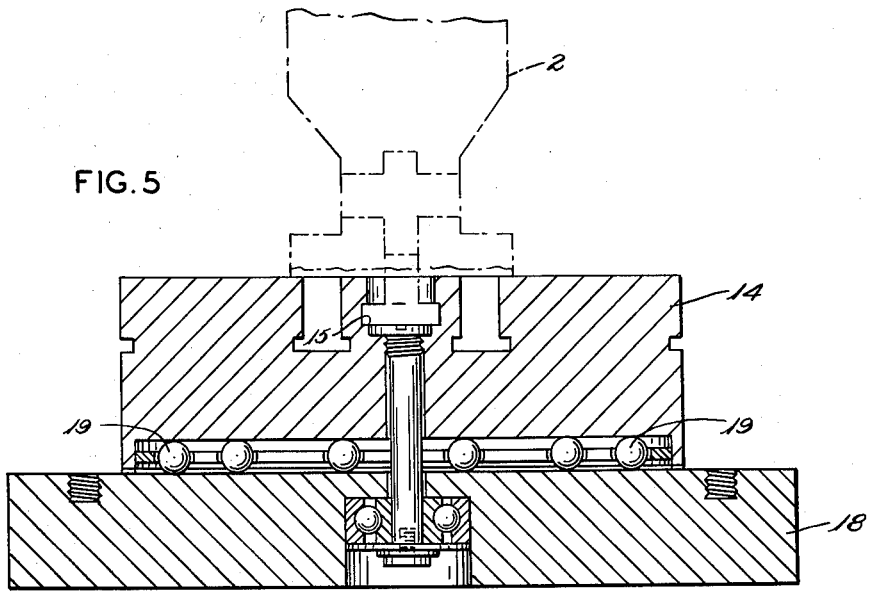
FIG. 5 is a vertical section taken on line 5—5 of FIG. 1.

In the embodiment of the invention shown in FIG. 1, this attachment 1 is carried by a support plate 14 that has a diametrically extending slot 15 therein. As best shown in FIG. 4, a large T bolt 16 is provided which has its head suitably locked in this positioning control slot 15 in the support plate 14 or other carrier plate and with a nut 17 being carried in a lower, exposed portion of the frame 2 so that the nut 17 can be tightened on the T bolt 16 and secure the frame 2 and attachment means in a desired position along the slot 15. To provide a further adjustment in the positioning of the frame 2, such support plate 14 is journalled on a base plate 18, and is secured thereto by any desired conventional means including ball bearings 19. FIG. 1 of the drawings best shows some type of a lock angle or lock strap 20 which is secured to the base plate 18 by a cap screw 21 so that the support plate 14 can be locked in a desired position with relation to the base plate 18.

It should be understood that this base plate 18 can be secured to the work table of a grinder, by mechanical means or by magnetic chuck means, as desired, so that the pin 12 being rotated in the frame 2 can be brought into desired relationship with cutting or grinding means provided on such tools for accurate grinding action thereon. In this instance, the frame 2 and associated pin 12 can be moved both diametrically (in one linear direction) while also being adapted to be moved through 360° of a circle for changing the relative positions of this pin 12 and any grinding means with which it is associated.

Preferably a set screw 22 is carried by the frame 2 to aid in holding the shaft or support bar 5 in a desired relative position to the frame 2 and prevent any rotation thereof.

Figure 2:
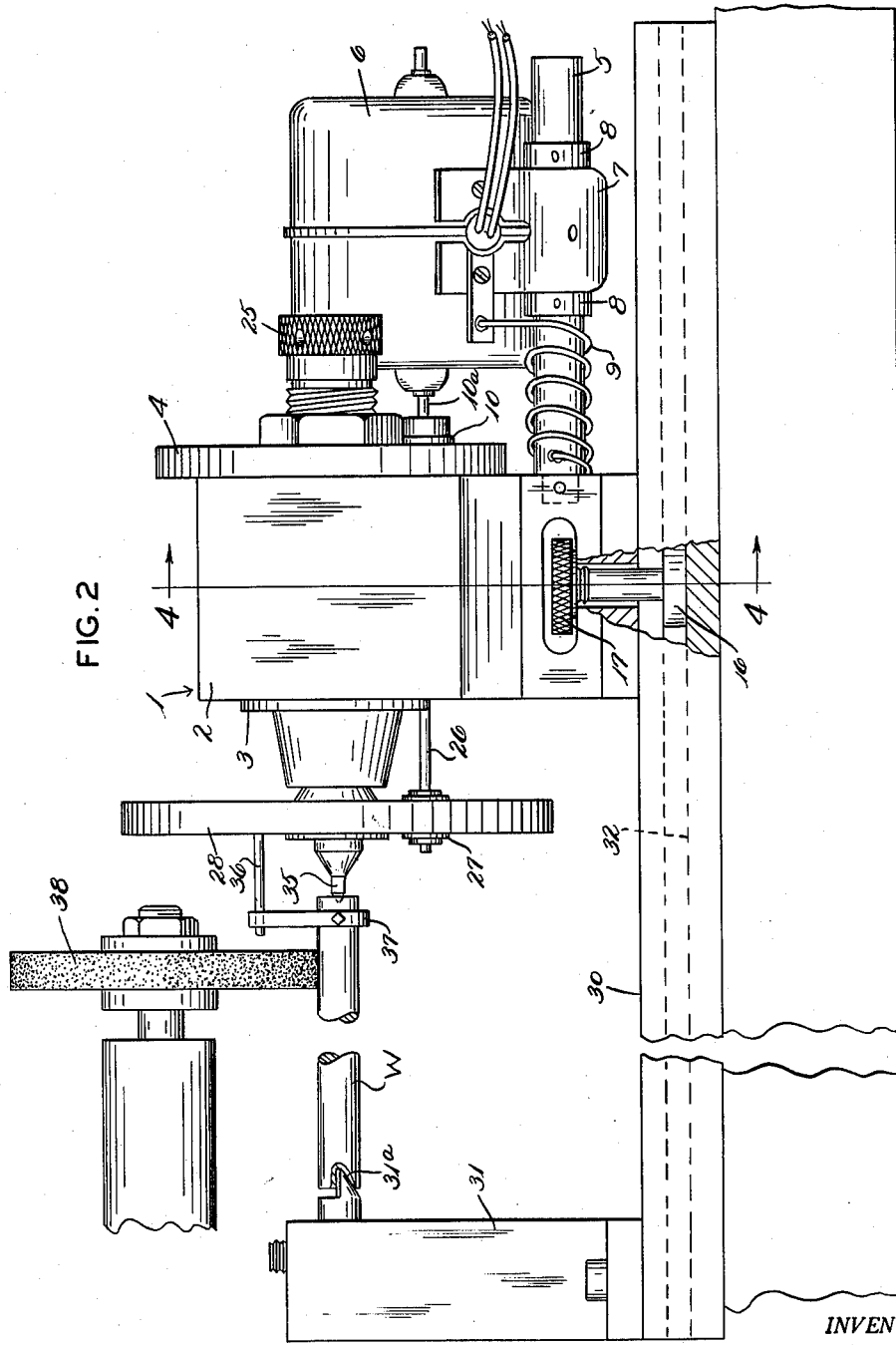
FIG. 2 is a side elevation, partially broken away and shown in section of the attachment of the invention modified to be positioned on a carrier plate having a tail stock provided therein.

Should it be desired to support both ends of the work piece while it is being processed by the attachment and associated means of the invention, then a simple tail stock type of a base plate 30 can be provided, as shown in FIGS. 2, 3 and 4 of the drawings. In such instance, the base plate 30 has a tail stock 31, with a centering pin 31a thereon, suitably secured thereto at one end thereof and the elongated base plate 30 has a center slot 32 therein extending substantially the length thereof. In such embodiment of the invention, the frame 2 is best adapted for accurate positioning of a work piece and rotation of such work piece around its axis while being brought into association with a grinding wheel, as outlined hereinbefore. In this instance it will be seen that the T bolt head for the screw 16 is received in the slot 32 for movement therealong.

Another feature of the invention, best shown in FIG. 3, is that the frame 2 carries an index pin 33 therein. Such index pin 33 is adapted to be brough out into engagement with accurately positioned apertures or bores 34 provided in the drive disc 4 so that the drive disc can be set in a desired arcuate position, alternately, and effect, for example, a grinding action in a predetermined angular relationship to each other on different portions of the periphery of the work piece or pin 12.

The disc 4, in FIGS. 1 to 4, is suitably secured to the tubular spindle 3 which is journalled in the frame 2, as by means of bearings 23, to provide the work support member in this embodiment of the apparatus. A member such as a tubular sleeve or draw member 25, engages the inner end of the collet 11 and secures it in the spindle 3 for rotation therewith.

In the arrangement of the apparatus of the invention shown in FIG. 2, an extension shaft 26 is secured to the output shaft 10a of the motor 6 and this extension shaft has a secondary driving roller, or pulley 27 thereon. The drive pulley is in driven rotary engagement with a second drive disc 28 that, in this instance, is suitably rotatably carried by the tubular spindle 24. In such embodiment of the invention, the pulley 10 is taken off, or adjusted, so that there is no drive force exerted on the disc 4. Thus, drive is transmitted only to the drive disc 28 in this embodiment of the invention and the spindle 3 is fixedly secured in place, preferably by use of the index pin 33.

A center pin 35 is fixedly positioned by the spindle 3 in FIG. 2. Thus a work piece W, FIG. 2 can be positioned between these pins 31a and 35 and be rotated by means of a driven pin 36 on the disc 31 that engages a conventional driving dog 37 secured to the work piece and extending therefrom. FIG. 2 of the drawings indicates how a grinding wheel 38, usually forming port of a standard grinding machine, can be used to grind diameters, or shoulders on the work piece W. If the drive of the work piece W is stopped, flats can be ground upon this work piece W in accurately controlled relationship thereto.

Figure 6:
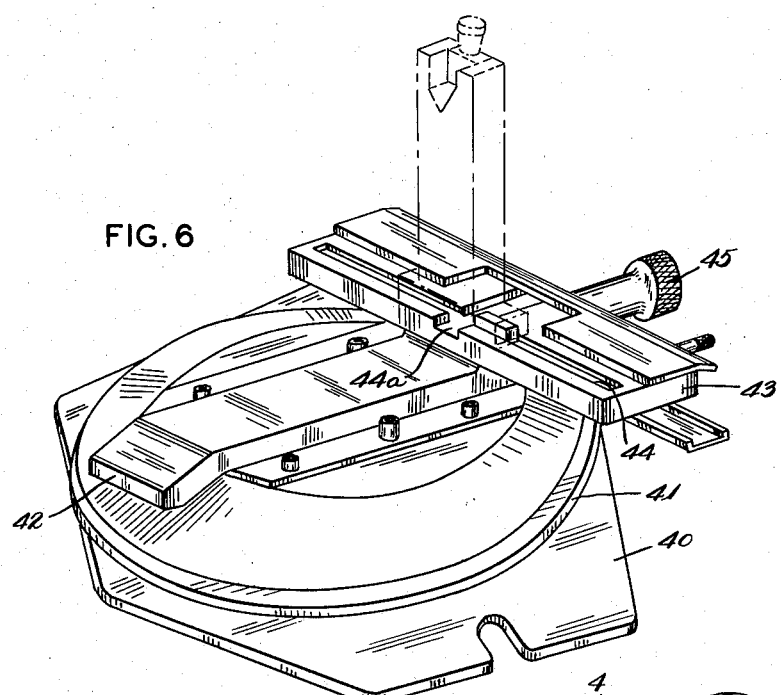
FIG. 6 is a perspective view of a modified type of a mounting plate means for the drive and support unit of the present invention.
Figure 7:
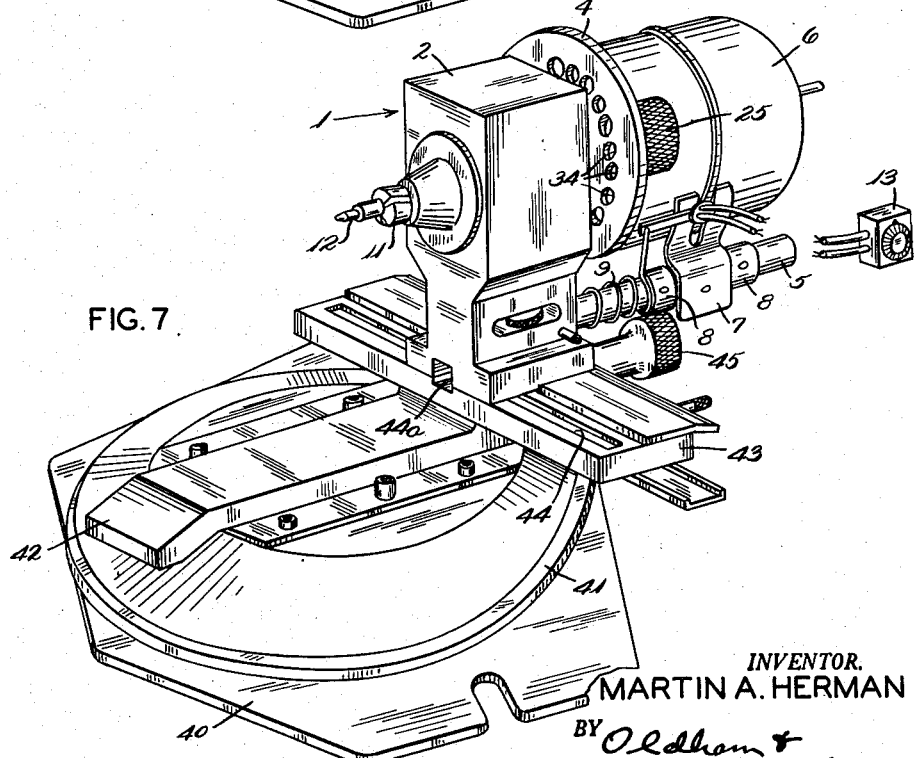
FIG. 7 is a perspective view of the apparatus shown in FIG. 6 with the drive and support means of the invention secured thereto.

A further modified type of mounting means for the attachment 1 of the invention is shown in FIGS. 6 and 7. In this instance, a base plate 40 is used and can be attached to a machine tool work bed, or other member in a conventional manner. Such base plate 40 carries a turn table 41 thereon which is adapted for rotary movement on the base plate and which can be secured in any desired relationship thereto. The turntable 41 positions on its upper surface a guide or control bar 42 for radial movement thereon and which has a carrier plate 43 suitably secured thereto. This carrier plate 43 has a guide slot 44 extending the length thereof and a control shaft 45 is provided for moving such carrier plate 43 along its longitudinal axis and thus move the attachment member 1 of the invention in the same direction. The support in FIGS. 6 and 7 is of the type shown in U.S. Patent No. 1,961,242. A guide slot 44a is also provided in the carrier plate 43 and extends the width thereof.

There are guides in the frame 2 that coincide with the guide slots 44 and 44a in the carrier plate 43. Cap screws extend through the frame 2 and engage the carrier plate 43 to form a unit from such members. Keys (not shown) engage the guides of the frame 2 and the guide slots 44 and 44a to position the frame on the axes of the carrier plate 43.

FIG. 8 of the drawings indicates how an attachment unit 1 of the invention can be brought into a varied relationship for association with a grinding wheel 50 carried by a support shaft 51. The unit may be carried on a turntable T such as the support plate 14, or the turntable 41. This shaft 51 connects to a conventional grinding machine and a work piece indicated by the letter W is positioned in and rotated by the drive means provided in the attachment unit 1 of the invention as hereinafter described. Thus the work piece W can be so positioned as to have an angle indicated at $\theta$ ground on or at the end of this work piece. The work piece also can be brought into face contact with the cylindrical cutting surface of the grinding wheel 50, if desired, or the work piece could be even indexed in a fixed position and then have the entire attachment unit 1 moved longitudinally of the grinding wheel for grinding a flat on the work piece W such as when cutting a hexagonal or other similar shapes or forms on the work piece W, as desired.

FIG. 9 shows that different diameters can be ground on a work piece X by the face of a grinding wheel 52, while a special contour is ground on the end of a work piece Y by a wheel 53 in FIG. 10. A groove 54 is being ground in a work piece Z in FIG. 11.

It will be realized that the unit 1 with slight additions thereto is shown in FIGS. 2, 3 and 4. This unit 1 may have a motor thereon connected to an output spindle or shaft in any desired manner.

The spindle 3 can have any conventional work holding means secured thereto and/or carried thereby. The friction drive provided by the driving roller 10 acts as a slip clutch should any obstruction arise to rotation of the spindle 3 or work piece associated with the unit 1. For the purposes of the specification and claims "spindle" and "shaft" are used interchangeably.

From the foregoing, it will be seen that the work piece 1 can be attached to any of a number of desired types of mounting means or base plates and with the attachment unit then being adapted to have a plurality of movements in a plane with relation to any desired grinding wheel or other machine tool with which the attachment 1 is associated. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. In an attachment for a machine tool, a frame, a shaft journalled in said frame, a drive disc secured to said shaft, a drive motor carried by said frame, a drive member extending from said motor and engaging the periphery of said drive disc to drive it, chuck means carried by said shaft for securing a work piece therein for rotary support action thereby, a support plate having a guide thereon, means securing said frame to said support plate for movement along said guide or for retention at a selected point thereon, and means on said frame for selectively securing said shaft and said work piece against rotation whereby said frame can be adjusted on said support plate and said work piece can be rotated on its own axis or be held against rotation for engaging a work member on the machine tool.

2. An attachment as in claim 1 where said means for selectively securing said shaft and said work piece against rotation is engageable with said drive disc.

3. In an attachment for a machine tool, a frame adapted to engage a guide on a support for adjustable positioning thereon, a shaft journalled in said frame, a drive disc secured to said shaft, a drive motor carried by said frame, a drive member extending from said motor and engaging the periphery of said drive disc to drive it, chuck means carried by said shaft for securing a work piece therein for rotary support action thereby, said frame having means for mounting same on the guide of the support, and means on said frame for selectively securing said shaft and said work piece against rotation whereby said work piece can be rotated on its own axis or be held against rotation for engaging a work member on a machine tool.

References Cited in the file of this patent

UNITED STATES PATENTS

| | | |
|---|---|---|
| 689,192 | Jones | Dec. 17, 1901 |
| 761,959 | Handy | June 7, 1904 |
| 1,703,613 | De Von | Feb. 26, 1929 |
| 2,421,358 | Sneva | May 27, 1947 |
| 2,527,778 | Trocki | Oct. 31, 1950 |
| 2,537,394 | Boice | Jan. 9, 1951 |
| 2,686,283 | Stephan | Aug. 10, 1954 |
| 2,701,432 | Kent | Feb. 8, 1955 |
| 2,746,218 | Bowie | May 22, 1956 |